(12) United States Patent
Kim et al.

(10) Patent No.: US 11,863,627 B2
(45) Date of Patent: Jan. 2, 2024

(54) SMART HOME DEVICE AND METHOD

(71) Applicant: LG ELECTRONICS INC., Seoul (KR)

(72) Inventors: Haejung Kim, Seoul (KR); Kunwoo Kim, Seoul (KR); Kyunghoon Yu, Seoul (KR); Byeonggwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/920,281

(22) PCT Filed: Apr. 21, 2020

(86) PCT No.: PCT/KR2020/005239
§ 371 (c)(1),
(2) Date: Oct. 20, 2022

(87) PCT Pub. No.: WO2021/215547
PCT Pub. Date: Oct. 28, 2021

(65) Prior Publication Data
US 2023/0179662 A1 Jun. 8, 2023

(51) Int. Cl.
*G06F 15/16* (2006.01)
*H04L 67/125* (2022.01)
(Continued)

(52) U.S. Cl.
CPC ........ *H04L 67/125* (2013.01); *H04L 12/2816* (2013.01); *H04L 69/18* (2013.01)

(58) Field of Classification Search
CPC .... H04L 67/125; H04L 12/2816; H04L 69/18
See application file for complete search history.

(56) References Cited

U.S. PATENT DOCUMENTS 10,362,119 B2 * 7/2019 Morales .............. H04L 12/2803
11,277,278 B2 * 3/2022 Ock ...................... H04W 12/06
(Continued)

FOREIGN PATENT DOCUMENTS

CN 109257258 A 1/2019
KR 10-0522234 B1 10/2005
(Continued)

OTHER PUBLICATIONS

International Search Report (PCT/ISA/210) issued in PCT/KR2020/005239, dated Dec. 21, 2020.

*Primary Examiner* — Duyen M Doan
(74) *Attorney, Agent, or Firm* — Birch, Stewart, Kolasch & Birch, LLP

(57) ABSTRACT

A smart home device including an input interface; a communication interface configured to communicate with a server and at least a first target device; and a processor configured to control the communication interface to communicate with the server using a first communication protocol to receive first target device format information describing a first communication control device format for communicating and controlling the first target device to perform a first operation, receive a first control command for communicating with and controlling the first target device input from the input interface, control the communication interface to communicate with the first target device using a second communication protocol different than the first communication protocol, wherein the first target device does not communicate with the server using the second communication protocol, convert the first control command into a format described by the first target device format information, and transmit the converted first control command to the first target device to control the first target device to perform the first operation.

16 Claims, 9 Drawing Sheets

(51) Int. Cl.
*H04L 12/28* (2006.01)
*H04L 69/18* (2022.01)

(56) References Cited

U.S. PATENT DOCUMENTS

| | | | | |
|---|---|---|---|---|
| 2009/0072991 | A1* | 3/2009 | Hayashi | H04L 12/282 |
| | | | | 340/11.1 |
| 2014/0218517 | A1* | 8/2014 | Kim | H04L 12/2836 |
| | | | | 348/143 |
| 2015/0282769 | A1 | 10/2015 | Song et al. | |
| 2017/0026195 | A1* | 1/2017 | Pan | H04L 12/2821 |
| 2017/0242557 | A1* | 8/2017 | Rotschield | H04L 12/2816 |

FOREIGN PATENT DOCUMENTS

| | | | |
|---|---|---|---|
| KR | 10-2009-0105713 A | 10/2009 | |
| KR | 10-2015-0116718 A | 10/2015 | |
| KR | 10-2016-0113440 A | 9/2016 | |
| KR | 10-2019-0058171 A | 5/2019 | |
| WO | WO 2016/145797 A1 | 9/2016 | |
| WO | WO 2017/041258 A1 | 3/2017 | |
| WO | WO 2017/141219 A1 | 8/2017 | |

* cited by examiner

SMART HOME DEVICE AND METHOD

CROSS-REFERENCE TO RELATED APPLICATION

This Application is the National Phase of PCT International Application No. PCT/KR2020/005239 filed on Apr. 21, 2020, which is hereby expressly incorporated by reference into the present application.

BACKGROUND OF THE INVENTION

Field of the Invention

The present disclosure relates to an electronic device, and more particularly, to a smart home device connected to a server and capable of controlling at least one electronic device, and a method for controlling the smart home device.

Discussion of the Related Art

With the development of communication technology, technologies have appeared which use other smart devices to control electronic devices to perform operations desired by a user even if the user does not directly operate the electronic devices used at home (e.g., vacuum cleaners, washing machines, smartphones, air purifiers, TVs, IoT, etc.). For example, when a user requests a control command to an electronic device through a smartphone, the control command may be transmitted to a server and processed in the server, and the electronic device may receive the processed control command from the server and perform a specific command.

On the other hand, in order to control other electronic devices using the smart device as described above, there is a problem that the control command for the electronic device is transmitted to the server and processed in the server.

SUMMARY OF THE INVENTION

According to the present disclosure, when controlling a target device (other electronic devices) by using a smart home device, the target device is directly controlled by using format information stored in the smart home device without transmitting a control command for controlling the target device to a server.

According to the present disclosure, when pieces of information obtainable by a smart home device, a first target device, and a second target device are different from each other, information that is not obtained from the smart home device and the first target device is obtained from the second target device, and the first target device is controlled by using the obtained information.

According to an embodiment of the present disclosure, a smart home device may include a communication interface configured to receive, from a server, format information for controlling each of one or more target devices, and a processor configured to, when a control command for a first target device among the target devices is input, convert the control command into a format corresponding to the first target device by using the format information and provide the converted control command to the first target device.

The format information may include at least one of a type of the target device, a communication protocol between the target device and the smart home device, command information for registration of the target device and connection to the target device, information about an operation to be performed by the target device, and language information.

The smart home device may further include an output interface, wherein, when format information for controlling the first target device is received, the processor may be configured to output registration information for registering the first target device and transmit, to the first target device, a request for registering the first target device.

The registration information for registering the first target device may include a type of the first target device and information about an operation to be performed by the first target device.

In addition, when a request for registering the first target device is accepted, the processor may be configured to output the type of the first target device and the information about the operation to be performed by the first target device.

In addition, when format information for controlling a second target device is received from the server, the processor may be configured to: output registration information for registering the second target device; transmit, to the second target device, a request for registering the second target device; and when the request of the second target device is accepted, output a type of the second target device and information about an operation to be performed by the second target device. In this case, the first target device may be different from the second target device.

The smart home device may further include a sensor interface. The control command for the first target device may include outputting, to the first target device, at least one of sensing information obtained from the sensor interface, first sensing information obtained from the first target device, and second sensing information obtained from the second target device.

In this case, the sensing information, the first sensing information, and the second sensing information may be different from each other.

The sensing information may include one of temperature information and humidity information, the first sensing information may include one of image information and spatial information, and the second sensing information may include air quality information.

According to an embodiment of the present disclosure, the smart home device may include at least one of an Internet of things (IoT), a refrigerator, a TV, a smartphone, and a home robot. The target device may include at least one of an Internet of small things (IoST), a refrigerator, a vacuum cleaner, a TV, an air conditioner, and an air purifier, which are controlled by the smart home device.

A home engine system of the present disclosure may include a server, a smart home device configured to communicate with the server, and one or more target devices configured to communicate with the smart home device, wherein the smart home device may include a processor configured to, when a control command for a first target device among the target devices is received, change the control command for the first target device into a format corresponding to the first target device and provide the changed control command to the first target device, and the first target device may perform an operation corresponding to the control command provided from the smart home device.

When a plurality of target devices are present, the server may be configured to transmit, to the smart home device, format information for controlling each of the plurality of target devices.

The server may be configured to provide, to the smart home device, format information for controlling a registerable target device.

The target device may perform an operation corresponding to the changed control command based on the format information.

Advantageous Effects

According to the present disclosure, since at least one target device in the home can be controlled by using a smart home device, an effective home engine system can be constructed.

According to the present disclosure, since a converted control command is generated by using format information included in a smart home device, the control command for controlling the target device does not need to be transmitted to a server and processed in the server, thereby improving user information security.

According to the present disclosure, when the format information of the smart home device is updated from the server, it is unnecessary to upgrade firmware corresponding to each target device from the server, thereby providing user convenience.

DETAILED DESCRIPTION OF THE EMBODIMENTS

Figure 1:
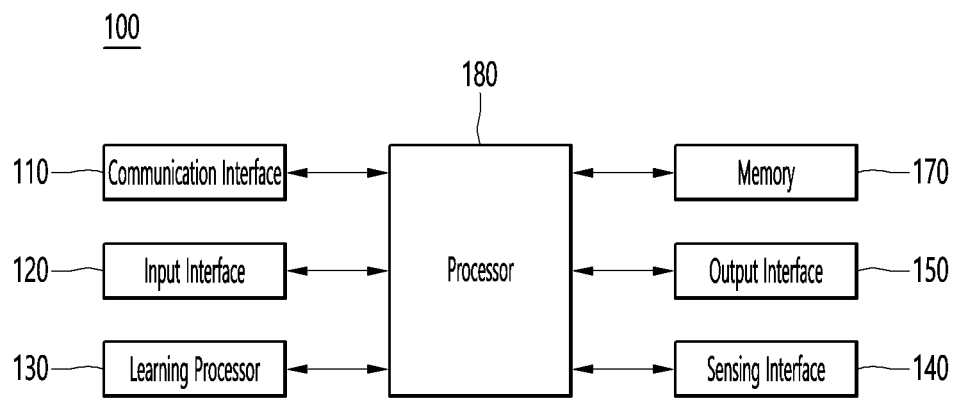
FIG. 1 is a block diagram illustrating an artificial intelligence (AI) device (100) according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<AI: Artificial Intelligence>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<XR: eXtended Reality>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing interface 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing interface 140 may acquire at least one of internal information about the AI device 100, ambient environment information about the AI device 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display interface for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
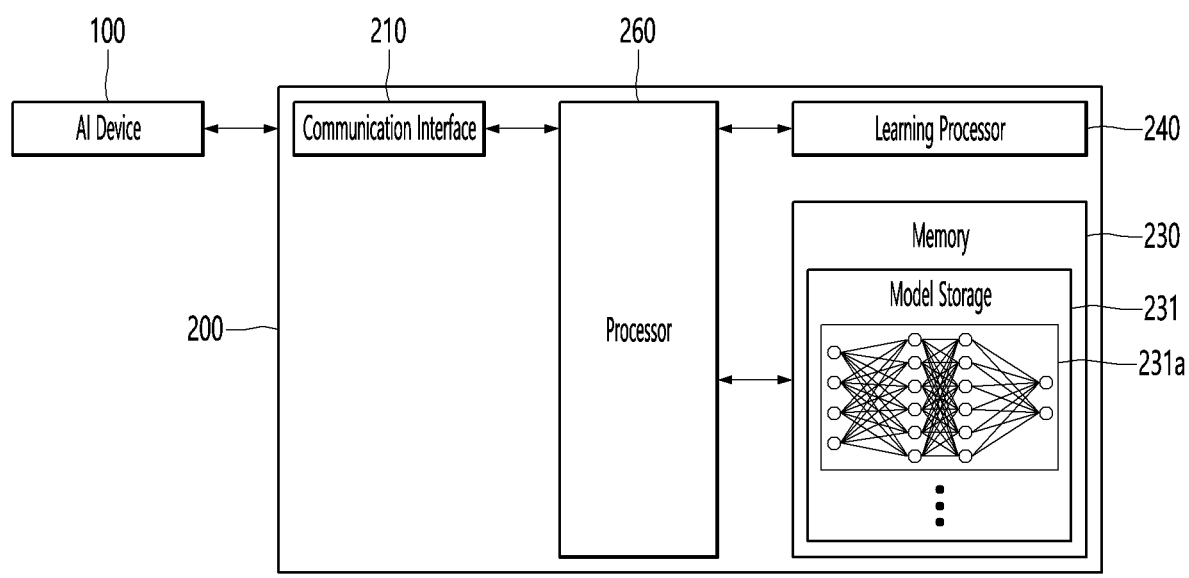
FIG. 2 is a block diagram illustrating an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
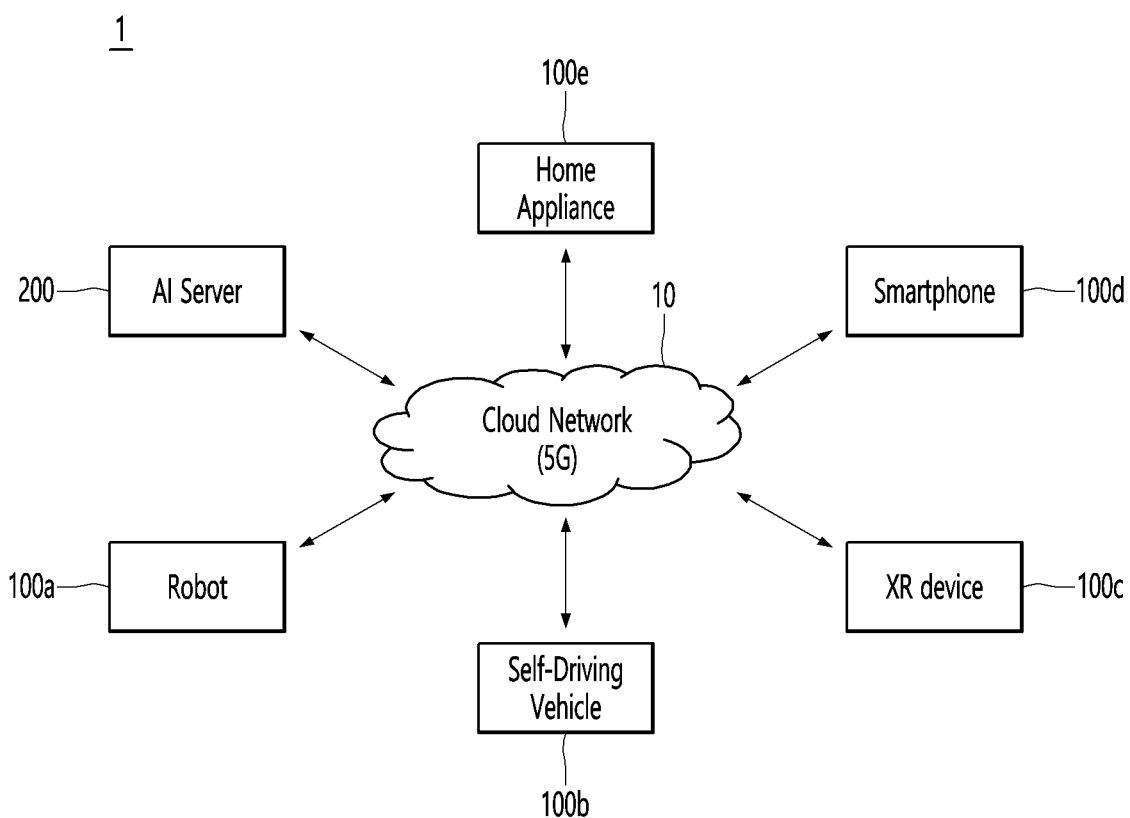
FIG. 3 is an overview illustrating an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driver such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driver based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driver such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driver based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
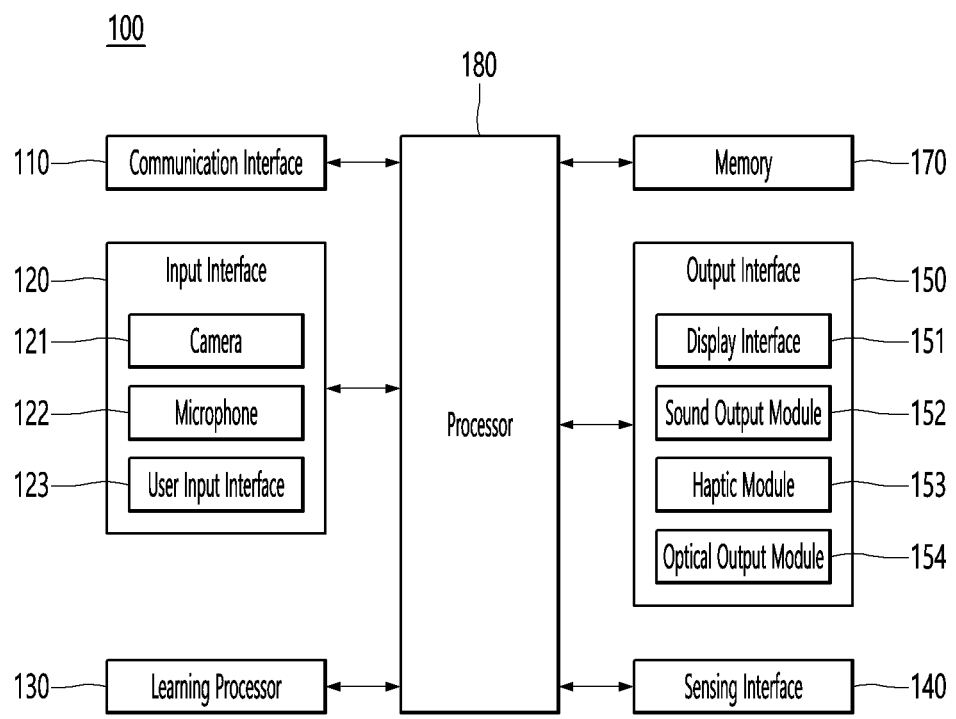
FIG. 4 is a block diagram illustrating an AI device according to an embodiment of the present disclosure.

FIG. 4 is a block diagram illustrating an AI device 100 according to an embodiment of the present disclosure.

The redundant repeat of FIG. 1 will be omitted below.

In the present disclosure, the AI device 100 may include an edge device.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI device 100 may include a plurality of cameras 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI device 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI device 100 to correspond to the inputted information.

The user input interface 123 may include a mechanical input means (or a mechanical key, for example, a button, a dome switch, a jog wheel, and a jog switch at the front, back or side of the AI device 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI device 100. For example, the display interface 151 may display execution screen information of an application program running on the AI device 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI device 100 and a user, and an output interface between the AI device 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI device 100. An example of an event occurring in the AI device 100 includes message reception, call signal reception, missed calls, alarm, schedule notification, e-mail reception, and information reception through an application.

Figure 5:
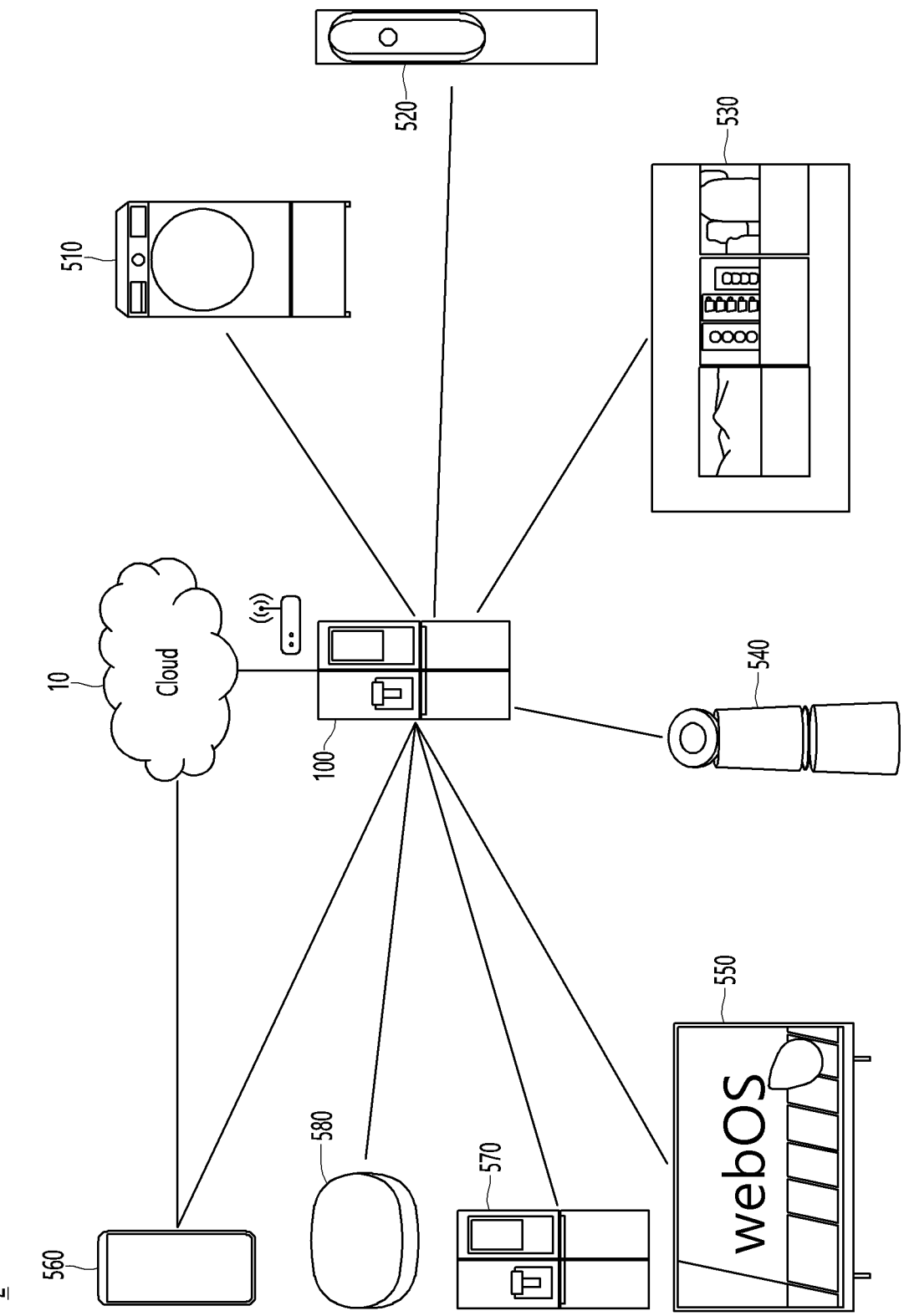
FIG. 5 is an overview illustrating a home engine system according to an embodiment of the present disclosure.

FIG. 5 illustrates a home engine system 2 according to an embodiment of the present disclosure.

The home engine system 2 of the present disclosure may include a server 10, a smart home device 100 communicating with the server 10, and one or more target devices 510, 520, 530, 540, 550, and 560 communicating with the smart home device 100. On the other hand, the target device illustrated in FIG. 5 is only an example and does not limit the present disclosure.

The server 10 may provide setting information required to control the smart home device 100, or may provide data required for the smart home device 100 to control the target device.

In addition, the server 10 may provide format information required for the smart home device 100 to control the one or more target devices 510, 520, 530, 540, 550, and 560.

The smart home device 100 may receive control commands transmitted from a mobile terminal 560 or the server 10, transmit the control commands to the one or more target devices 510, 520, 530, 540, 550, and 560, and manipulate the operation of the target device.

In the present disclosure, when the server 10 provides format information for controlling target devices to the smart home device 100, the smart home device 100 may control the one or more target devices by using format information corresponding to each of the one or more target devices, without additional communication with the server 10.

For example, the server 10 may provide, to the smart home device 100, format information required for the smart home device 100 to control the first target device. Thereafter, when the smart home device 100 receives the control command for controlling the first target device, the smart home device 100 may convert the received first control command into a format corresponding to the first target device by using the format information received from the server 10, and may provide the converted control command to the first target device.

The first target device may communicate with the smart home device 100 to receive the converted control command and perform an operation corresponding to the converted control command.

According to the present disclosure, the first target device may execute the control command received from the smart home device 100 through communication with the smart home device 100 without communicating with the server 10.

As a protocol for communication between the smart home device 100 and the server 10, a wireless LAN communication protocol such as Wi-Fi (802.11), a communication protocol such as mobile communication (e.g., 4G/5G), and a wired LAN communication protocol such as TCP/IP may be used.

In addition, as a protocol for communication between the smart home device 100 and the one or more target devices 510, 520, 530, 540, 550, and 560, not only a wireless LAN communication protocols such as Wi-Fi (802.11), a communication protocol such as mobile communication (e.g., 4G/5G), and a wired LAN communication protocols such as TCP/IP, but also infrared communication (Infra Red), Bluetooth, ZigBee, a short-range communication protocol such as Ultra WideBand (UWB) may be used.

According to an embodiment of the present disclosure, the smart home device 100 may include at least one of IoT, a refrigerator, a TV, a smartphone, and an AI robot.

In addition, the mobile terminal 560 among the target devices 500 may include a computing device that uses mobile communication or occupies a small space, such as a tablet, a smartphone, or a computer. In an embodiment, a wireless LAN such as Wi-Fi may be used at home, such as a smartphone or a tablet, to communicate with the smart home device 100 (Direct Wi-Fi), or the smart home device 100 may be controlled by communicating with the server 10.

In addition, the target device may include at least one of a washing machine 510, an air conditioner 520, other Internet of small things 530, an air purifier 540, a TV 550, a refrigerator 570, and a vacuum cleaner 580, which are controlled by the smart home device 100.

Hereinafter, the operation of the smart home device 100 of FIG. 5 according to various embodiments of the target device 500 will be described in detail.

Figure 6:
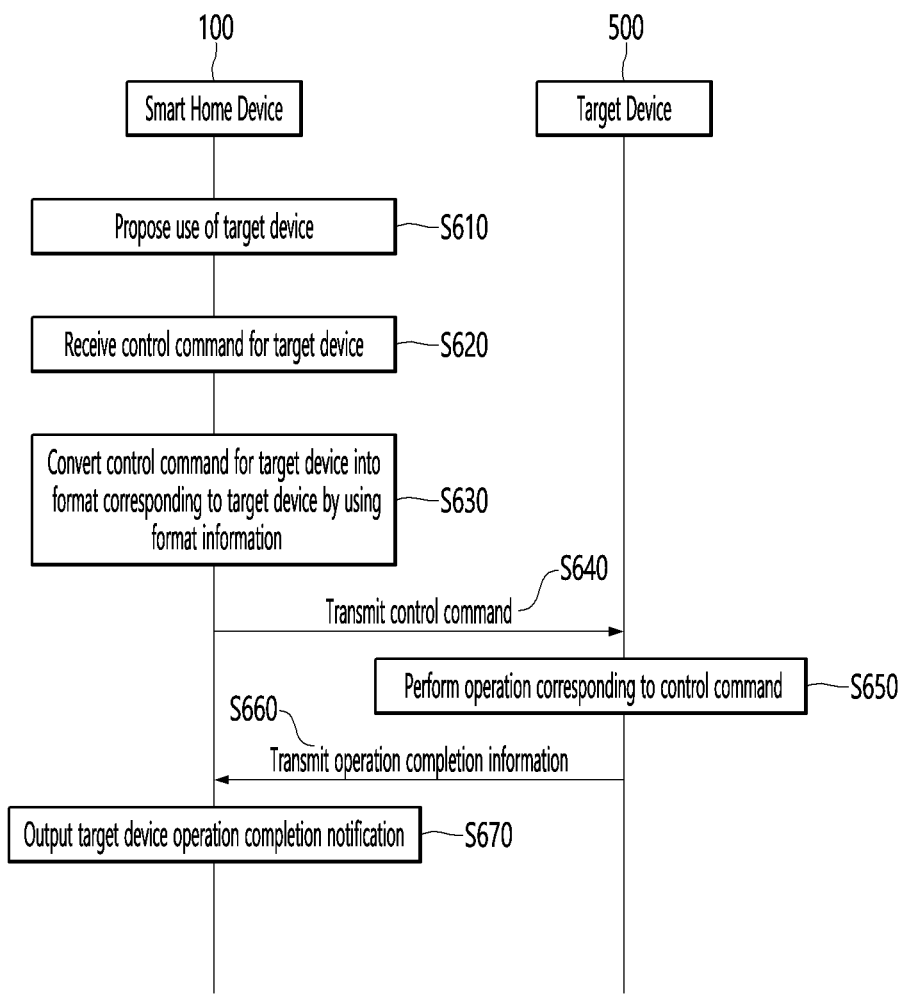
FIG. 6 is a flowchart illustrating operations of a smart home device and a target device according to an embodiment of the present disclosure.

FIG. 6 is a diagram illustrating operations of the smart home device and the target device according to an embodiment of the present disclosure.

In an embodiment of the present disclosure, the smart home device 100 may be connected to one or more target devices 500. In this case, the smart home device 100 may include an Internet of things (IoT), a refrigerator, a TV, a smartphone, and an electronic device such as a home robot.

Specifically, the smart home device 100 may serve as a controller capable of controlling the target device 500, and may include an output interface 150 for registering and controlling the target device 500, and a communication interface 110 for communicating with a server 10 and the target device 500.

Since the smart home device 100 has to be able to receive format information by communicating with the server 10 in real time, it is preferable that power should always be on.

The target device 500 may include Internet of small things (IoST), a refrigerator, a vacuum cleaner, a TV, an air conditioner, an air purifier, a blinder equipped with other parts capable of communication, a light, a speaker, and electronic devices such as household appliances, which are connected to the smart home device 100.

Specifically, the target device 500 may be a device (controlee) controlled by the smart home device 100, and may include a communication interface for communication with the smart home device 100. On the other hand, unlike the smart home device 100, the target device 500 may not necessarily communicate with the server 10. In addition, an output interface may be provided according to the type of the target device 500 and the operation provided by the target device 500, and it is preferable that whether to maintain constant power is optional.

Since the smart home device 100 has to be able to communicate with a large-capacity cloud network such as the server 10, a high-capacity network protocol (WiFi, TCP/IP, etc.) is required. However, since the target device 500 does not necessarily communicate with the server 10, the target device 500 may include an electronic device equipped with a small-scale communication modem such as a low-cost, low-power websocket, Bluetooth, and ZigBee for communication with the smart home device 100. On the other hand, the above description is only an example of the present disclosure and does not limit the present disclosure.

The smart home device 100 of the present disclosure may receive format information for controlling each of the one or more target devices from the server 10, and may store the received format information in the memory 170. The smart home device 100 may register the target device 500 corresponding to the received format information and control the target device 500.

The smart home device 100 may propose the use of the target device 500 to the user (S610). In more detail, the smart home device 100 may control the output interface 150 to display a use proposal image of the registered target device 500. In this case, the use proposal image may include at least one of a type of the registered target device 500, a function of the target device 500, information about the operation to be performed by the target device 500, and language information.

According to the use proposal of the target device 500, the smart home device 100 may receive the control command for the target device 500 from the user (S620). For example, when the output interface 150 of the smart home device 100 outputs the use proposal image, the user may input the target device 500 included in the use proposal image and the control command for the operation to be performed by the target device 500. In this case, the input method may be performed through the input interface 120 of the smart home device 100.

For example, the user may select the target device 500 and the operation to be performed by the target device 500 by touching the use proposal image displayed on the smart home device 100.

When the processor 180 of the smart home device 100 receives the control command for the target device 500 (S620), the processor 180 may convert the control command into a format corresponding to the target device 500 by using the format information received from the server 10 (S630).

The format information may include at least one of a type of the target device (e.g., TV, smart light, blind, etc.), a communication protocol between the target device and the smart home device (e.g., SSAP, ZigBee, Bluetooth, etc.), command information for registration of the target device and connection to the target device, information about the operation to be performed by the target device, and language information. That is, the format information may include script information that serves as a medium so that the processor 180 of the smart home device 100 converts the input control command into a command, protocol, language, etc. that the target device 500 can understand.

For example, when the control command for turning on the TV, which is the target device, is input to the smart home device 100, the smart home device 100 may use the format information to convert the control command received to correspond to the type of TV (e.g., a unique identification number), the communication protocol between the TV and the smart home device 100 (e.g., WiFi), and control command information for turning on the TV, and provide the converted control command to the TV.

The processor 180 of the smart home device 100 may provide the converted control command to the target device 500 (S640).

The target device 500 may receive the control command provided by the smart home device 100 and perform the operation corresponding to the control command (S650). At this time, the control command provided by the smart home device 100 means the control command converted into the format that the target device 500 can recognize, and the target device 500 may immediately perform the operation corresponding to the control command.

When the target device 500 completes performing the operation corresponding to the control command, the target device 500 may transmit operation completion information to the smart home device 100 (S660).

The processor 180 of the smart home device 100 may receive the operation completion information from the target device 500 and control the output interface 150 to output a target device operation completion notification (S670).

Figure 7:
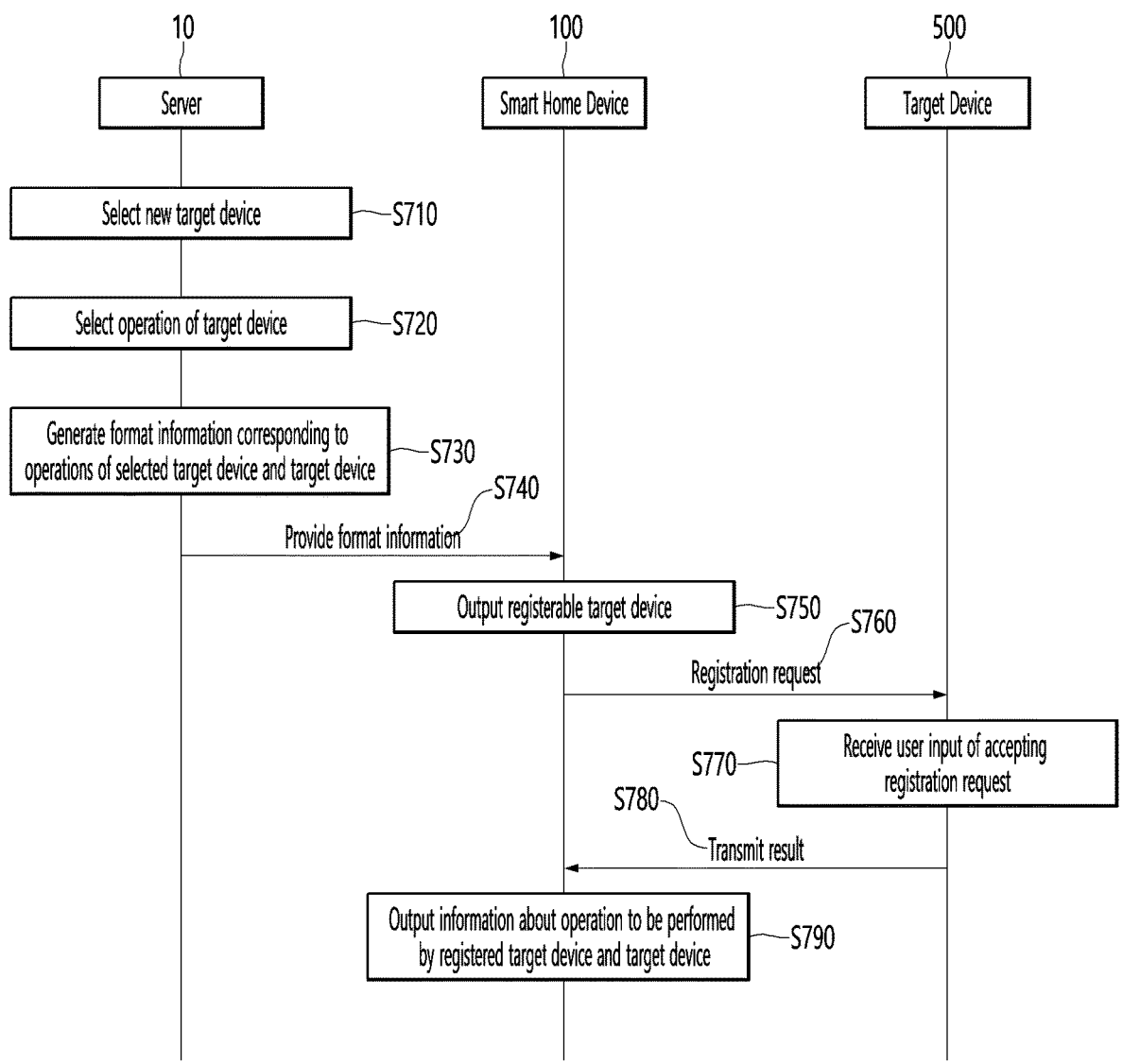
FIG. 7 is a flowchart illustrating operations of a server, a smart home device, and a target device according to an embodiment of the present disclosure.

FIG. 7 is a diagram illustrating operations of a server, a smart home device, and a target device according to an embodiment of the present disclosure.

FIG. 7 is a diagram for describing a process of registering the target device 500 in the smart home device 100 according to an embodiment of the present disclosure.

A home engine system 2 of the present disclosure may include a server 10, a smart home device 100 communicating with the server 10, and one or more target devices communicating with the smart home device 100.

First, the server 10 may select a new target device 500 to be controlled by the smart home device 100 (S710). The server 10 may select an operation to be provided by the new target device 500, and the new target device 500 may be controlled by the smart home device 100 (S720). When the target device 500 and the scenario validation check for the operation to be provided by the target device 500 are suitable, the server 10 may generate format information for controlling the operations of the selected target device 500 and the target device 500 (S730). The format information generated in operations S710 to S730 may be received from another device (e.g., a smartphone app) connected to the server 10. Alternatively, the format information may be directly updated in the server 10.

The server 10 may provide format information about the registerable target device 500 to the smart home device 100 (S740). In this case, the format information about the registerable target device 500 may include at least one of a type of the target device, a communication protocol between the target device and the smart home device, command information for registration of the target device and connection to the target device, information about the operation to be performed by the target device, and language information. In this case, the format information may be a script format.

The communication interface of the smart home device 100 may receive format information for controlling each of the one or more target devices from the server 10.

When the processor 180 of the smart home device 100 receives the format information for controlling the target device 500, the processor 180 may output registration information for registering the target device 500 (S750). In this case, the registration information for registering the target device 500 may include the type of the target device and the information about the operation to be performed by the first target device.

The processor 180 of the smart home device 100 may transmit a request for registering the target device to the target device (S760).

When the target device 500 receives a registration request from the smart home device 100, the target device 500 may provide a notification to the user for registration. When the target device 500 receives a user input for accepting the registration request (S770), the target device 500 may transmit a result of the registration request of the target device to the smart home device 100.

The processor 180 of the smart home device 100 accepts the request for registering the target device, the processor 180 may control the output interface 150 to output the type of the target device 500 and the information about the operation to be performed by the target device 500 (S790).

For example, according to the present disclosure, the smart home device 100 is connected to the one or more target devices 500. Therefore, as described above with reference to FIG. 6, when the smart home device 100 receives a control command for a first target device 510 among the registered target devices 500, the smart home device 100 may change the control command for the first target device 510 into a format corresponding to the first target device 510 by using the format information. The changed control command may be provided to the first target device 510.

Upon receiving the changed control command, the first target device 510 may perform an operation corresponding to the control command provided from the smart home device 100.

According to the present disclosure, since the smart home device 100 is connected to the one or more target devices 500, the smart home device 100 may be connected to, in addition to the first target device 510, a second target device 520 different from the first target device 510.

Specifically, when the processor 180 of the smart home device 100 receives the format information for controlling the second target device 520 from the server 10, the processor 180 may output registration information for registering the second target device 520 and may transmit a request for registering the second target device 520 to the second target device 520.

When the second target device 520 receives a registration request from the smart home device 100, the second target device 500 may provide a notification to the user for registration. The second target device 520 may receive a user input for accepting the registration request, and may transmit a result of the registration request of the second target device 520 to the smart home device 100.

When the request of the second target device 520 is accepted, the smart home device 100 may output the type of the first target device 510 and the information about the operation to be performed by the first target device 510.

Figure 8:
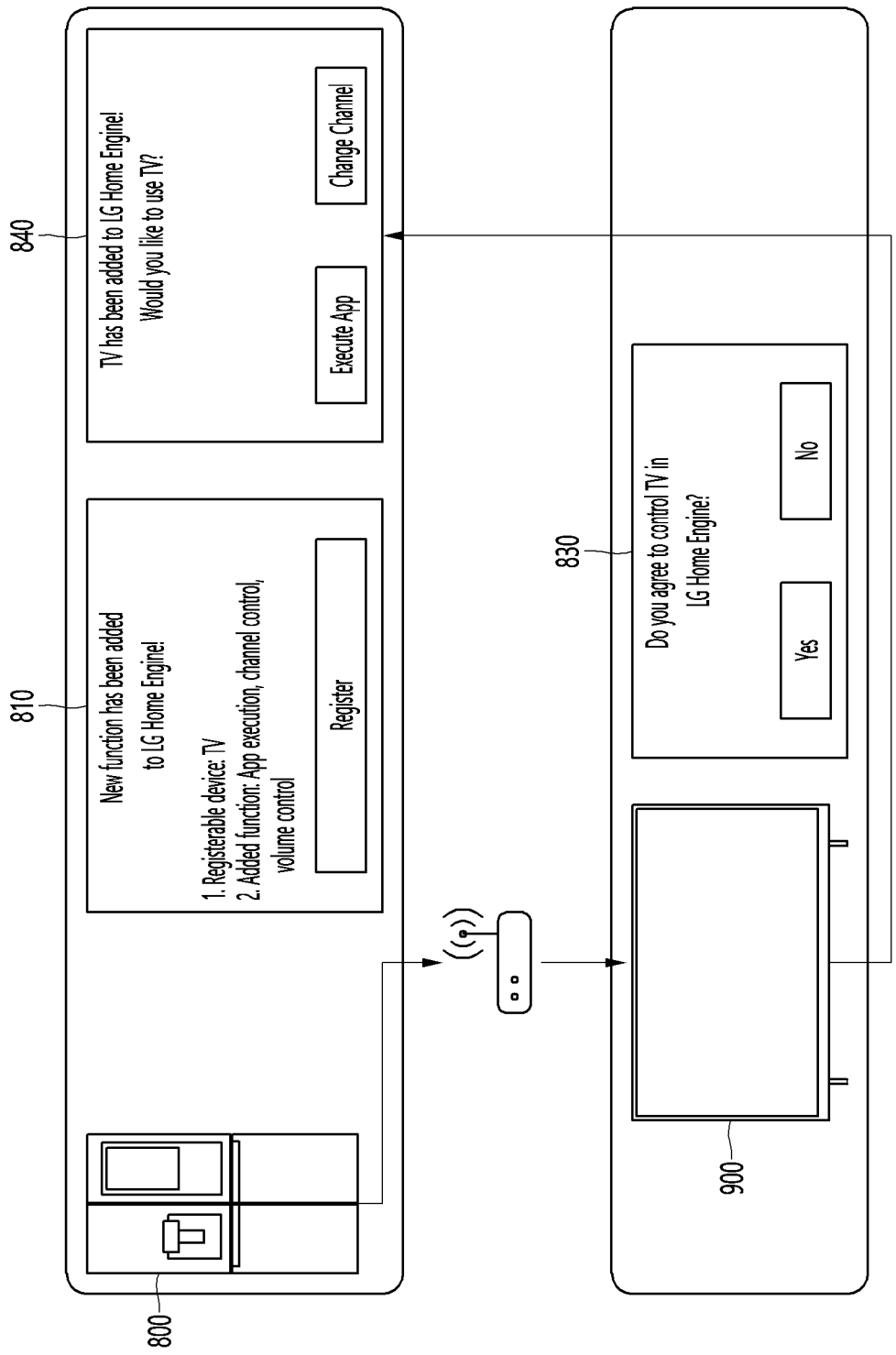
FIG. 8 is a diagram illustrating an operation process of a smart home device and a target device according to an embodiment of the present disclosure.

FIG. 8 is a diagram illustrating an operation process of the smart home device and the target device according to an embodiment of the present disclosure.

FIG. 8 illustrates an example of a registration process of the smart home device and the target device according to an embodiment of the present disclosure.

For example, the smart home device 100 connected to the server 10 may include a smart refrigerator 800. The target device 500 connected to the smart home device 100 may include a TV 900. The smart refrigerator 100 and the TV 500 may communicate with each other through a Wi-Fi network.

The smart refrigerator 800 may receive format information for controlling the TV 900 from the server 10. When the smart refrigerator 800 receives format information for controlling the TV 900, the smart refrigerator 800 may output the TV 900, which is the name of the registerable device that can be registered, and a registration proposal image 810 in which information related to an operation that the TV 900 can provide is displayed, in order to register the TV 900 in the smart refrigerator 800.

The TV 900 may receive a request for registering the TV 900 from the smart refrigerator 800, and may output a request image 830 for registering the TV 900.

The registration request image 830 may include information about the TV 900 and the operation to be performed by the TV 900. A user may accept the request through a touch input for the request image 830 for registering the TV 900.

When the request for registration of the TV 900 is accepted, the smart refrigerator 800 may output a use proposal image 840 in which the type of the TV 900 and the information about the operation that can be performed by the TV 900 are displayed. When the user makes a touch input on the use proposal image 840, the smart refrigerator 800 may convert a control command corresponding to the touch input into a format for controlling the TV 900 by using the format information, may provide the converted control command to the TV 900 so as to control the TV 900 to perform the operation corresponding to the control command.

On the other hand, the embodiment is only an example for describing the present disclosure, and the present disclosure is not limited to the embodiment. In addition, format information provided by the server 10 may be different according to the type of each target device 500, the operation that can be performed by the target device, and the communication protocol.

Figure 9:
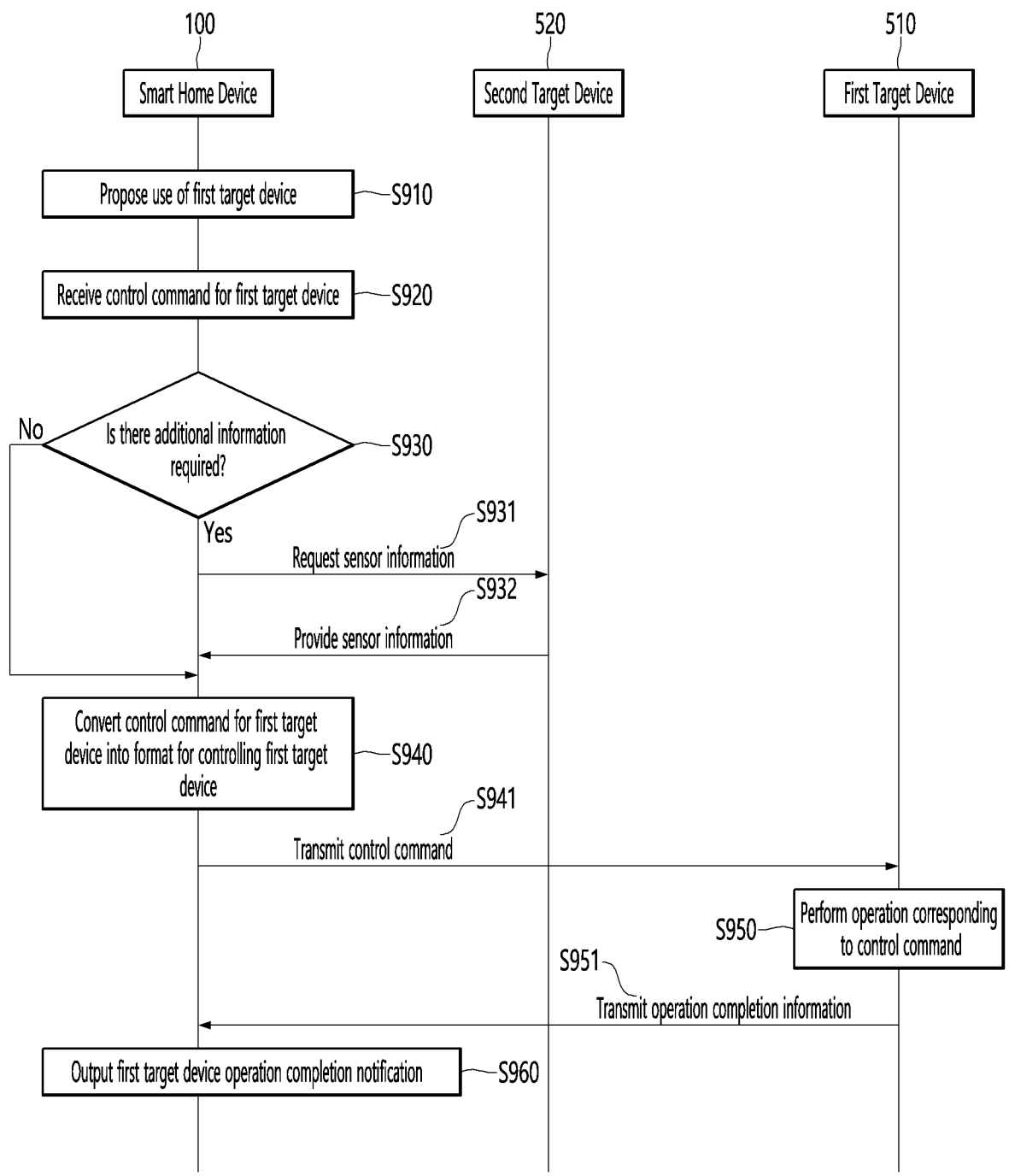
FIG. 9 is a flowchart illustrating operations of a smart home device and a target device according to an embodiment of the present disclosure.

FIG. 9 is a diagram illustrating operations of the smart home device and the target device according to an embodiment of the present disclosure.

According to an embodiment of the present disclosure, when a plurality of target devices are present, the server 10 of the smart home system 2 may transmit format information for controlling each of the plurality of target devices to the smart home device 100. The smart home device 100 may control each of a plurality of target devices according to the processes of FIGS. 6 and 7.

FIG. 9 is a diagram illustrating an embodiment when the smart home device 100 is connected to the first target device 510 and the second target device 520.

According to the present disclosure, the smart home device 100 may propose the use of the target device 510 (S910). In more detail, the processor 180 of the smart home device 100 may control the output interface 150 to output a use proposal image of the first target device 510.

When a control command for the first target device 510 is received based on the use proposal (S920), the smart home device 100 may convert the control command for the first target device into a format corresponding to the first target device 510 by using format information for controlling each of the target devices.

In this case, the first target device 510 may require additional information in order to perform an operation according to the control command. The additional information may be obtained from the second target device 520, but may include information that cannot be obtained from the smart home device 100 and the first target device 510. For example, since the smart home device 100, the first target device 510, and the second target device 520 may be different devices, pieces of obtainable sensor information may also be different from each other. That is, data that can be obtained only by the second target device 520 may be present.

For example, sensor information obtained from the sensing interface 140 of the smart home device 100, first sensing information obtained from the first target device 510, and second sensing information obtained from the second target device 520 may include at least one of data obtained from a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, an air quality sensor, and a camera.

Since sensors mounted on the smart home device 100, the first target device 510, and the second target device 520 may be different from each other, the sensor information of the sensing interface 140, the first sensing information, and the second sensing information may also be different from each other.

When additional information is required (S930), the smart home device 100 may request the second target device 520 for the additional information (S931) and receive the additional information from the second target device 520 (S932).

When the control command for the first target device 510 is input, the processor 180 of the smart home device 100 may convert the received control command into a control command corresponding to the format of the first target device 510 by using the format information (S940). The smart home device 100 may provide the control command of the changed format to the first target device (S941).

The first target device 510 may perform an operation corresponding to the received control command (S950) and transmit to the smart home device 100, operation completion information corresponding to the control command (S951).

The smart home device 100 may output a first target device operation completion notification (S960).

Figure 10:
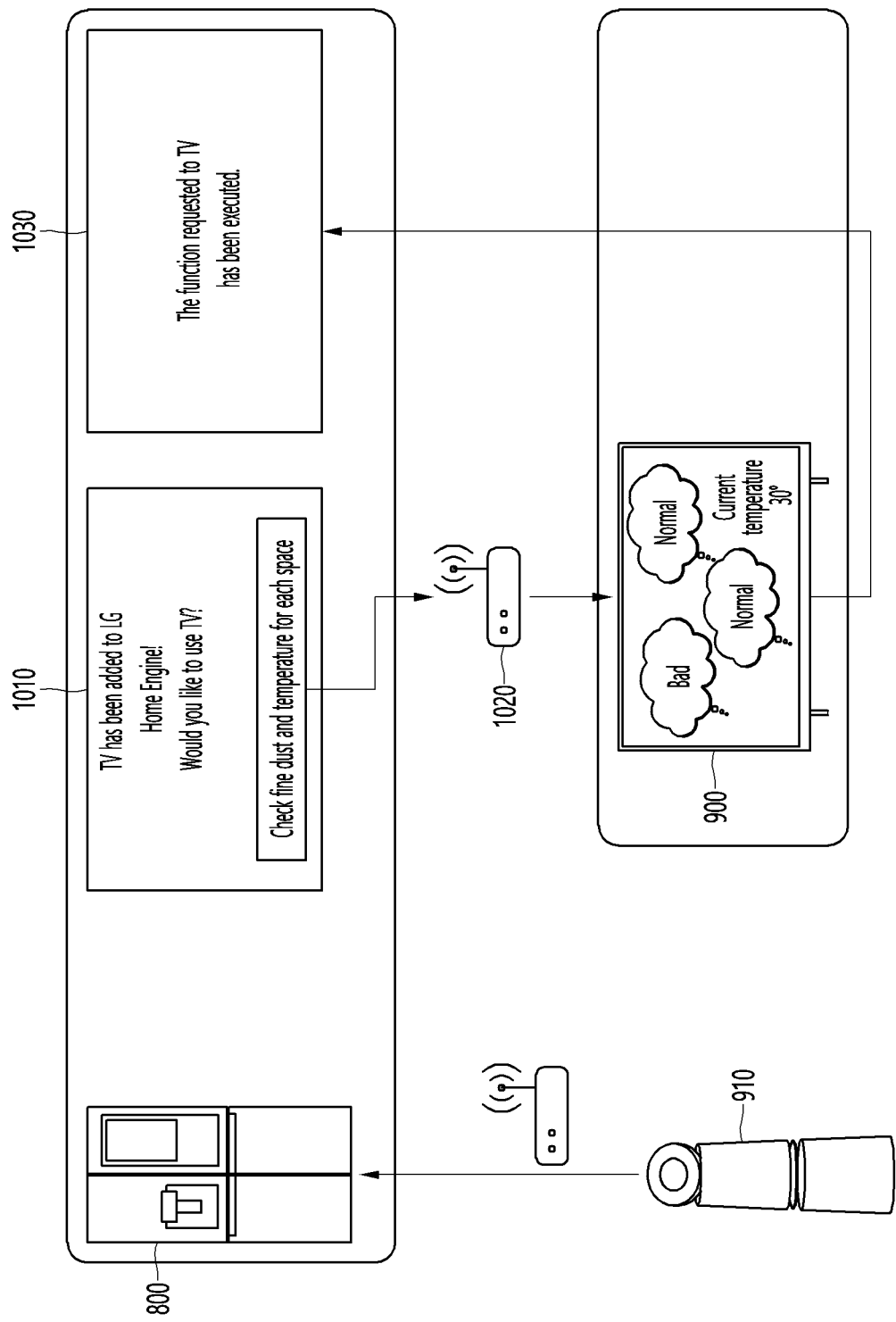
FIG. 10 is a diagram illustrating operations of a smart home device and a target device according to an embodiment of the present disclosure.

FIG. 10 is a diagram illustrating operations of the smart home device and the target device according to an embodiment of the present disclosure.

FIG. 10 is a diagram for describing the embodiment of the present disclosure described with reference to FIG. 9.

For example, it is assumed that the control command for the first target device 510 includes at least one of sensor information obtained from the sensing interface 140 of the smart home device 100, first sensing information obtained from the first target device 510, and second sensing information obtained from the second target device 520.

Hereinafter, a case where the smart home device 100 is a refrigerator 800, the first target device is a TV 900, and the second target device 910 is an air purifier will be described as an example.

A user may control the TV 900, which is the first target device, by using a use proposal image 1010 displayed on an output interface of the refrigerator 800. For example, a function provided by the TV 900 may include an operation of checking fine dust and current temperature information for each space, and the user may select the TV and the 'fine dust and temperature check operation for each space' of the TV from the use proposal image 1010.

On the other hand, since fine dust information is not included in information obtainable from the refrigerator 800 and the TV 900, the refrigerator 800 may request fine dust information from the air purifier 910 as additional information.

The air purifier 910 may provide the fine dust information to the refrigerator 800.

In an embodiment of the present disclosure, the refrigerator 800 may obtain temperature information from the sensing interface 140, may obtain spatial information through the camera sensor of the TV 900, and may obtain fine dust information through the air quality sensor of the air purifier 910.

When the user wants to check the fine dust and the current temperature corresponding to the current space by using the TV 900, the refrigerator 800 may use the format information to convert the 'fine dust and temperature for each space' check command into a format that can be recognized by the TV 900. When the refrigerator 800 provides the converted control command to the TV 900, the TV 900 may output an image of fine dust and temperature of the current space by using the temperature information of the refrigerator 800, the fine dust information of the air purifier 910, and the current space information recognized by the camera sensor of the TV 900, based on the converted control command.

After outputting the image, the TV 900 may provide an operation completion notification to the refrigerator 800, and the refrigerator 800 may output an operation completion notification 1030 of the TV 900.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. In addition, the computer may include the processor 180 of the terminal.

The invention claimed is:

1. A smart home device comprising:
an input interface;
a communication interface configured to communicate with a server and at least a first target device; and
a processor configured to:
control the communication interface to communicate with the server using a first communication protocol to receive first target device format information describing a communication control device format for communicating and controlling the first target device to perform a first operation,
receive a first control command for communicating with and controlling the first target device from the input interface,
in response to determining that the first target device requires additional information to perform the first control command, request sensor information from a second target device,
receive the additional information from the second target device,
control the communication interface to communicate with the first target device using a second communication protocol different than the first communication protocol, wherein the first target device does not communicate with the server using the second communication protocol,
convert the first control command into a format described by the first target device format information, and
transmit the converted first control command to the first target device to control the first target device to perform the first operation,
wherein the smart home device comprises at least one of an Internet of things (IoT), a refrigerator, a TV, a smartphone, and a home robot, or the first target device comprises at least one of an Internet of small things (IoST), a refrigerator, a vacuum cleaner, a TV, an air conditioner, and an air purifier.

2. The smart home device of claim 1, wherein the first target device format information comprises at least one of:
a type of the first target device,
a type of the second communication protocol used between the first target device and the smart home device,
first command information for registration of the first target device and connection to the first target device,
first information about the operation to be performed by the first target device, and
language information describing a language used by the input interface.

3. The smart home device of claim 1, wherein the processor is further configured to:
in response to receiving the first target device format information from the server, output registration information on an output interface of the smart home device for registering the first target device, and
in response to receiving a confirmation for registering the first target device, control the communication interface to transmit a registration request to the first target device.

4. The smart home device of claim 3, wherein the registration information for registering the first target device comprises a type of the first target device and information about the operation to be performed by the first target device.

5. The smart home device of claim 4, wherein the processor is further configured to:
output the type of the first target device and the information about the first operation to be performed by the first target device in response to a successful registration of the first target device.

6. The smart home device of claim 3, wherein the processor is further configured to:
control the communication interface to communicate with the server using the first communication protocol to receive second target device format information describing a communication control device format for communicating and controlling the second target device to perform a second operation,
output registration information for registering the second target device,
control the communication interface to transmit a request for registering the second target device to the second target device, and
output a type of the second target device and information about the second operation to be performed by the second target device in response to a successful registration of the second target device.

7. The smart home device of claim 6, further comprising:
a sensor interface,
wherein the first control command for the first target device comprises outputting, to the first target device, at least one of sensing information obtained from the sensor interface, first sensing information obtained from the first target device, and second sensing information obtained from the second target device.

8. The smart home device of claim 7, wherein
wherein the sensing information comprises one of temperature information and humidity information,
wherein the first sensing information comprises one of image information and spatial information, and
wherein the second sensing information comprises air quality information.

9. A home engine system comprising:
a server;
a smart home device configured to communicate with the server; and
at least a first target device configured to communicate with the smart home device,
wherein the smart home device comprises a processor configured to:
  communicate with the server using a first communication protocol to receive first target device format information describing a first communication control device format for communicating and controlling the first target device to perform a first operation,
  receive a first control command for communicating with and controlling the first target device input from an input interface of the smart home device,
  in response to determining that the first target device requires additional information to perform the first control command, request sensor information from a second target device,
  receive the additional information from the second target device,
  communicate with the first target device using a second communication protocol different than the first communication protocol, wherein the first target device does not communicate with the server using the second communication protocol,
  convert the first control command into a format described by the first target device format information, and
  transmit the converted first control command to the first target device to control the first target device to perform the first operation,
wherein the smart home device comprises at least one of an Internet of things (IoT), a refrigerator, a TV, a smartphone, and a home robot, and
wherein the first target device comprises at least one of an Internet of small things (IoST), a refrigerator, a vacuum cleaner, a TV, an air conditioner, and an air purifier.

10. The home engine system of claim 9, wherein the target device format information comprises at least one of:
a type of the first target device,
a type of the second communication protocol between the first target device and the smart home device,
first command information for registration of the first target device and connection to the first target device,
first information about the operation to be performed by the first target device, and
language information describing a language used by the input interface.

11. The home engine system of claim 9, wherein the processor is further configured to:
  in response to receiving the first target device format information from the server, output registration information on an output interface of the smart home device for registering the first target device, and
  in response to receiving a confirmation for registering the first target device, transmit a registration request to the first target device.

12. The home engine system of claim 11, wherein the registration information for registering the first target device comprises a type of the first target device and information about the operation to be performed by the first target device.

13. The home engine system of claim 11, wherein the processor is further configured to:
  output the type of the first target device and the information about the first operation to be performed by the first target device in response to a successful registration of the first target device.

14. The home engine system of claim 11, wherein the processor is further configured to:
  communicate with the server using the first communication protocol to receive second target device format information describing a second communication control device format for communicating and controlling the second target device to perform a second operation,
  output registration information for registering the second target device,
  transmit a request for registering the second target device to the second target device, and
  output a type of the second target device and information about the second operation to be performed by the second target device in response to a successful registration of the second target device.

15. The home engine system of claim 14, further comprising:
a sensor interface,
wherein the first control command for the first target device comprises outputting, to the first target device, at least one of sensing information obtained from the sensor interface, first sensing information obtained from the first target device, and second sensing information obtained from the second target device.

16. The home engine system of claim 15, wherein
wherein the sensing information comprises one of temperature information and humidity information,
wherein the first sensing information comprises one of image information and spatial information, and
wherein the second sensing information comprises air quality information.

* * * * *